United States Patent
Schlick et al.

(10) Patent No.: US 9,388,913 B2
(45) Date of Patent: Jul. 12, 2016

(54) SEAL AND CONTROL DEVICE HAVING SAID SEAL

(75) Inventors: Matthias Schlick, Oelsnitz (DE); Werner Döhla, Gefrees (DE); Olaf Seewald, Bayreuth (DE)

(73) Assignee: RAUSCH & PAUSCH GmbH, Selb (DE)

( * ) Notice: Subject to any disclaimer, the term of this patent is extended or adjusted under 35 U.S.C. 154(b) by 118 days.

(21) Appl. No.: 14/342,215

(22) PCT Filed: Jul. 31, 2012

(86) PCT No.: PCT/EP2012/064961
§ 371 (c)(1),
(2), (4) Date: Apr. 8, 2014

(87) PCT Pub. No.: WO2013/029903
PCT Pub. Date: Mar. 7, 2013

(65) Prior Publication Data
US 2014/0217318 A1   Aug. 7, 2014

(30) Foreign Application Priority Data

Sep. 1, 2011  (DE) .......................... 10 2011 082 007

(51) Int. Cl.
| F16K 31/06 | (2006.01) |
| F16J 15/32 | (2016.01) |
| F16J 15/56 | (2006.01) |
| F16K 25/00 | (2006.01) |

(52) U.S. Cl.
CPC ......... *F16K 31/0658* (2013.01); *F16J 15/3232* (2013.01); *F16J 15/3236* (2013.01); *F16J 15/56* (2013.01); *F16K 25/005* (2013.01)

(58) Field of Classification Search
CPC   F16K 31/0658; F16K 25/005; F16J 15/3236; F16J 15/56; F16J 15/3232
USPC ............. 251/129.15; 277/440, 459, 502, 549, 277/562, 564
See application file for complete search history.

(56) References Cited

U.S. PATENT DOCUMENTS

| 3,955,796 | A | * | 5/1976 | Grove ........................... 251/172 |
| 4,261,583 | A | * | 4/1981 | de Vries et al. ................ 277/550 |
| 4,280,741 | A | * | 7/1981 | Stoll ............................... 384/16 |

(Continued)

FOREIGN PATENT DOCUMENTS

| GB | 2 332 261 A | 6/1999 |
| WO | 2005/102807 A1 | 11/2005 |

OTHER PUBLICATIONS

International Search Report in PCT/EP2012/064961 dated Oct. 19, 2012.

*Primary Examiner* — John K Fristoe, Jr.
*Assistant Examiner* — Andrew J Rost
(74) *Attorney, Agent, or Firm* — Maier & Maier, PLLC

(57) ABSTRACT

A dynamic seal for sealing radially two members that are displaceable relative to each other axially comprises a sealing body made of elastomeric material having two axially spaced, radially exterior sealing lips and two axially spaced, radially interior sealing lips, and a supporting body bearing the sealing body and consisting of a harder material than the sealing body, in particular of a plastic. The supporting body possesses a radially exposed guiding portion extending between two sealing lips in the axial direction for axially guiding the movable member, and an anchoring portion opposing the guiding portion for anchoring the seal in the other member.

16 Claims, 3 Drawing Sheets

(56) References Cited

U.S. PATENT DOCUMENTS

Figure 1:
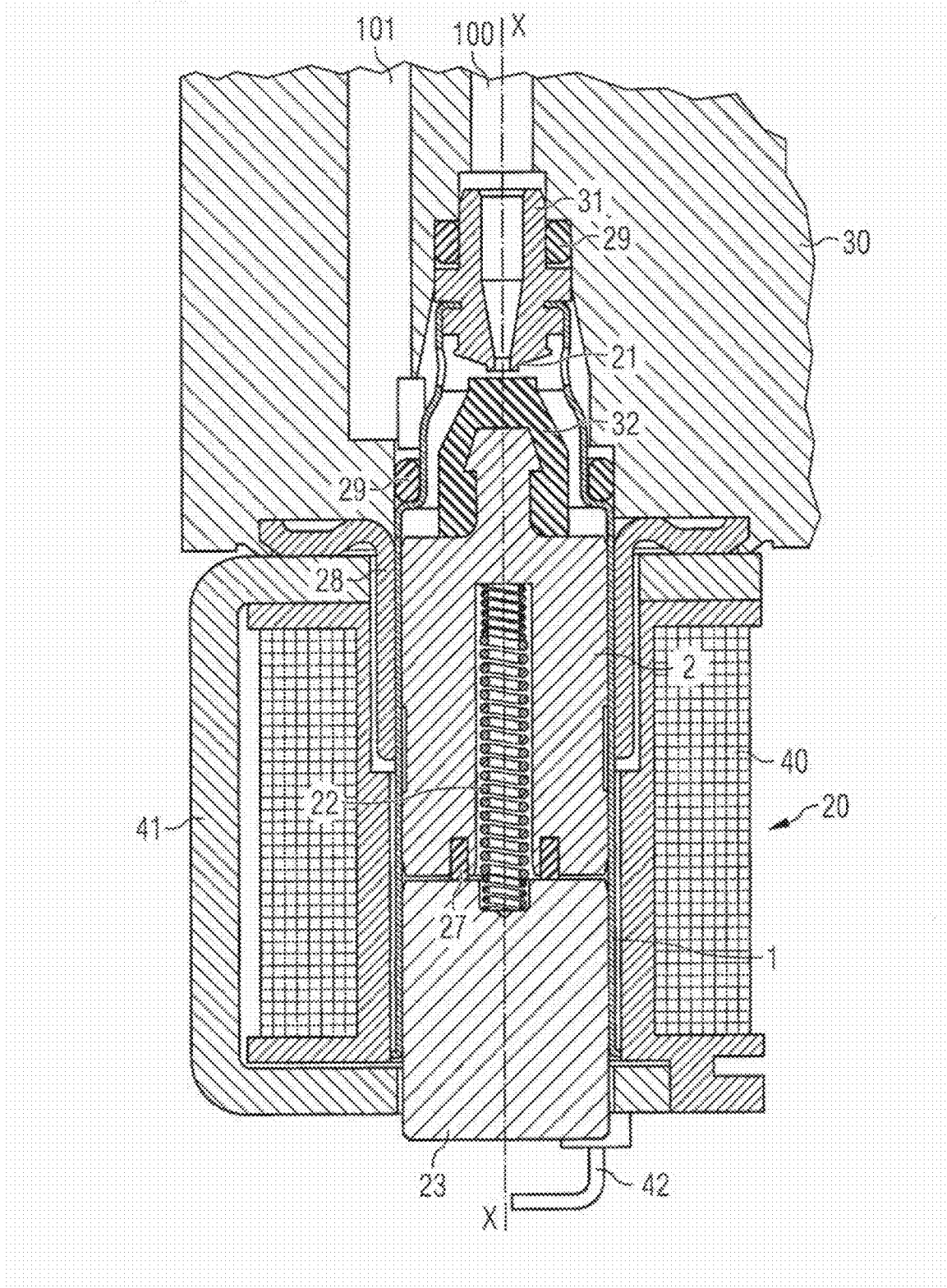

| | | |
|---|---|---|
| 4,484,512 A | 11/1984 | Dechavanne |
| 4,616,837 A | 10/1986 | Beutel |
| 5,897,119 A * | 4/1999 | McMillen .................... 277/562 |
| 7,959,159 B2 * | 6/2011 | Hocker et al. ................ 277/559 |
| 8,985,856 B2 * | 3/2015 | Arai ................................ 384/15 |

* cited by examiner

SEAL AND CONTROL DEVICE HAVING SAID SEAL

This invention relates in general to an air suspension valve block for an air suspension system for vehicles, relating in particular to an electromagnetic valve for such an air suspension valve block in order to influence the air exchange within the air suspension system, to a control device for the electromagnetic valve, and to a seal for the control device.

In an air suspension system of a vehicle, valves known as transverse shut-off valves or double valves regulate the air supply between the left and right sides of the vehicle, by filling the air bellows of the air suspension system with air or letting air out. This also serves to adjust the height of the vehicle, known as electrical level control. For this purpose, reservoirs of the air suspension system can be opened or closed, for example, or the air bellows can be connected to additional volume. In particular, it is possible to use electromagnetically actuated valves in an air suspension system of a vehicle as transverse shut-off valves in an air suspension valve block of the air suspension system.

WO 2005/102807 A1 discloses a solenoid valve which can be employed as a transverse shut-off valve in an air valve suspension block. The solenoid valve has an elastic sealing element for lying against a sealing seat in a closed position of the valve, and a control piston or magnetic armature cooperating with the sealing element. The control piston can be displaced axially against a spring force by means of an electrically energizable coil in order to open the valve. At great nominal widths of the valve and high pressure differences, the spring must be configured to be so strong that the valve remains in the closed position by means of the spring force even when the pneumatic pressure in the system counteracts the spring force. If the system pressure acts conversely in the direction of the spring force, a high magnetic force must be made available for opening the valve in order to overcome the spring force and the pressure difference (as well as frictional forces within the valve). The known valve thus reaches limits.

For solving this problem, there could be provided a pressure compensation bore through the axially displaceable member of the valve, in particular the control piston or magnetic armature. The system pressure would then act on the axially displaceable member from both sides and would thus ideally be compensated, so that substantially only the spring force would have to be overcome for opening the valve. However, the axially displaceable member would then have to be guided sealingly, since otherwise the valve would have leakage through the pressure compensation bore.

The invention hence relates in particular to a seal with which members that are displaceable axially relative to each other are mutually sealed radially. Such seals find application in control devices, such as for example in valves or setting pistons, that are actuated by means of pressurization, in particular pneumatic pressure.

Seals for such a purpose must frequently be small, light and inexpensive. They perform a sealing function in the axial moving direction and moreover seal inwardly and outwardly in the radial direction. Typical examples of these so-called "dynamic" seals are tandem seals, Quad-rings or simple O-rings. A Quad-ring, unlike an O-ring, has an approximately square or X-shaped cross section with two radially exterior and two radially interior, axially spaced-apart sealing lips. A tandem seal, on the other hand, comprises a supporting body for a radially interior O-ring for sealing inwardly and a radially exterior O-ring for sealing outwardly and can be combined with a sliding ring, made of PTFE for example, which lies between an O-ring and the movable member. The sliding ring performs a guidance function for the movable member. For improving the guidance function, an additional guide ring can be used axially adjacent to the sliding ring.

The primary object of the present invention is hence to propose an air suspension valve block for an air suspension system of vehicles which works reliably even at high system pressures. A secondary object of the present invention is to propose a dynamic seal assembly and a control device equipped therewith, or electromagnetically actuated valve equipped therewith, which performs the above-mentioned functionalities (axial and two-sided radial sealing function as well as axial guidance function) and meets the above-mentioned basic conditions (small, light, inexpensive) to advantageously enable employment in the air suspension valve block.

This object is achieved by a seal having the features of claim 1. In claims dependent thereon there are stated advantageous developments and embodiments of the invention.

Accordingly, the seal according to the invention possesses a sealing body made of elastomeric material having two axially spaced, radially exterior sealing lips and two axially spaced, radially interior sealing lips, as is known in principle from Quad-rings. Furthermore, the seal has a supporting body bearing the sealing body. This supporting body consists of a harder material than the sealing body and has a radially exposed portion which extends in the axial direction between two sealing lips and serves as a guiding portion with an axial guidance function for the movable member. To enable this axial guidance function to be performed during operation of the seal, the radial dimension of the guiding portion relative to the radial dimensions of the adjacent two sealing lips must be chosen accordingly. It is thus essential that the two sealing lips extend slightly beyond the guiding portion in the radial direction. For only then can the two sealing lips perform a sealing function during operation, while the radially exposed guiding portion lying therebetween performs the axial guidance function.

The seal according to the invention integrates all the essential functions of a dynamic seal assembly in one part, for it not only seals the two members that are movable relative to each other both in the axial moving direction and radially inwardly and outwardly, but simultaneously performs the guidance of the axially moved member.

Due to the two interior and two exterior sealing lips, the seal can advantageously be configured symmetrically as a whole, but at least the sealing body, and accordingly seal in the same way in opposite moving directions of the movable member.

Preferably, the supporting body has on its side opposing the guiding portion an anchoring portion via which the seal can be fixed with the other of the two members. The anchoring portion is again disposed between two sealing lips and extends for the above-mentioned purpose beyond said two sealing lips in the radial direction. The anchoring portion can then be so anchored for example in a circumferential groove of the relevant member that the two sealing lips come to lie against the member in a sealing manner respectively adjacent to this circumferential groove.

Preferably, the guiding portion of the supporting body is configured on a radially inwardly pointing surface of the seal, in order to guide e.g. a control device's axially moved drive element running in the seal. The anchoring portion opposing the guiding portion accordingly extends radially outwardly in this variant. However, it is in principle also conceivable that the supporting body has both on the radial inside and on the radial outside an exposed guiding portion extending between two sealing lips in the axial direction, namely e.g. in the case that both members being mutually sealed radially by means of the seal according to the invention are movable members. In this case, only the seal would be fixed in a stationary manner, while the two members bordering thereon are respectively movable.

The elastomeric material of the sealing body can advantageously be formed onto the supporting body during the primary forming process, for example be cast on or in particular molded on by injection molding. In this way, the manufacture is inexpensive and dimensionally accurate.

Further, it is preferable when the elastomeric material of the sealing body penetrates the supporting body. This creates a permanently stable connection between these two seal components. It is thus particularly preferable when the supporting body has at least one axial passage which is filled with elastomeric material of the sealing body. It is thus possible to produce between the axially spaced-apart sealing lips a connection that is homogeneous in terms of material.

A preferable elastomeric sealing-body material is ethylene propylene diene rubber (EPDM). The EPDM can advantageously have PTFE added thereto. The hardness of the sealing-body material preferably amounts to between 65 and 80 Shore A, in particular about 75 Shore A.

The material of the supporting body can be metallic, but is preferably a polymeric material. The advantage of polymeric material lies, on the one hand, in the lower weight. On the other hand, the seal can then especially advantageously be manufactured fast and inexpensively by two-step injection molding. The polymeric material of the supporting body is preferably a thermoplastic or also a thermosetting plastic, optionally with suitable additives for improving the sliding properties, and in any case not an elastomer. It is preferable to use the thermoplastic, polyphenylene sulfide (PPS). Advantageously, the supporting-body material is glass-fiber-reinforced, with e.g. PPS GF40 being particularly suitable.

An air suspension valve block according to the invention for an air suspension system of a vehicle comprises an electromagnetically actuated valve having the seal described hereinabove. The valve has in particular a pressure compensation bore in the axial direction through the axially movable control piston, so that the valve works reliably even at high system pressures.

Figure 2:
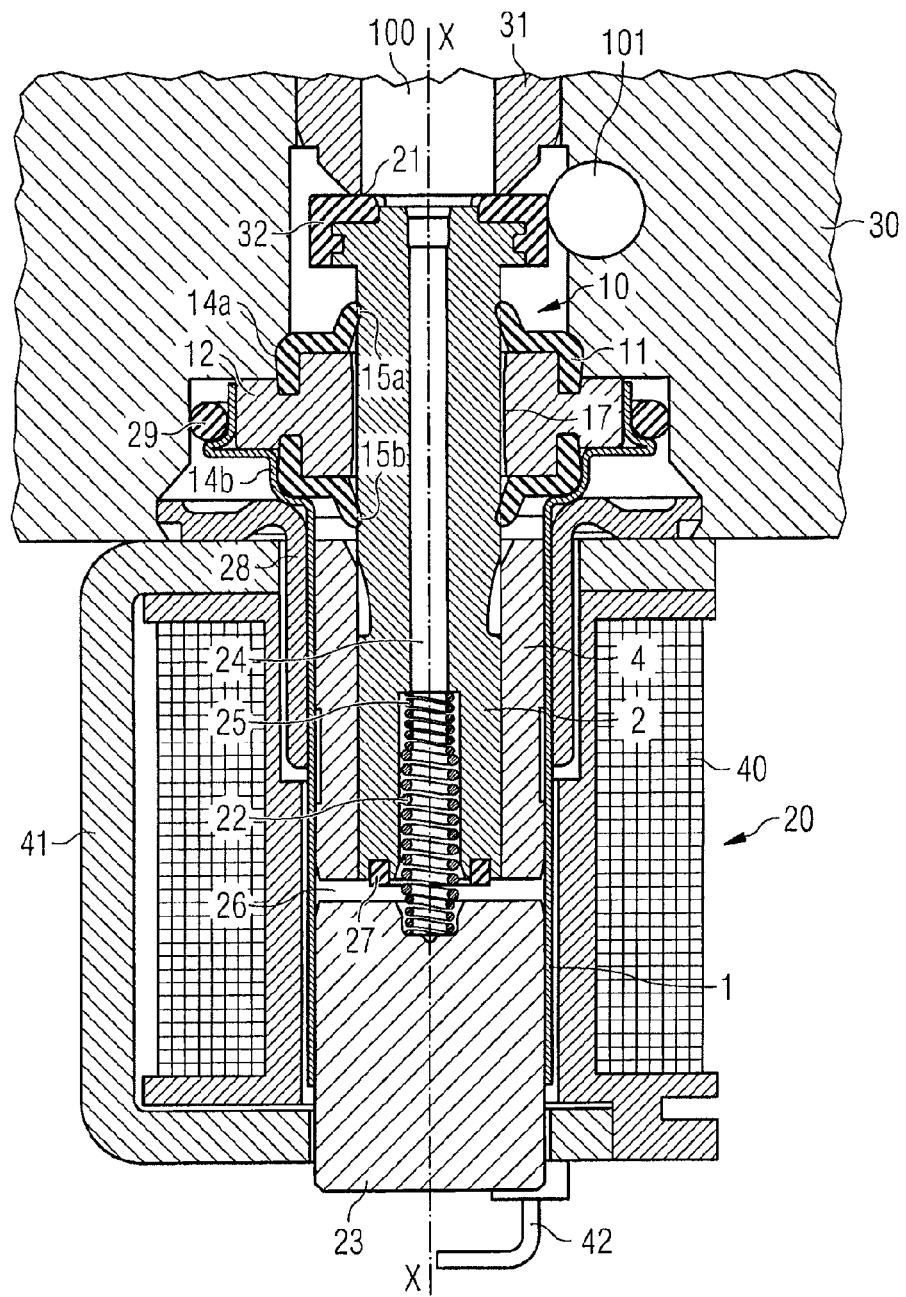
Figure 3:
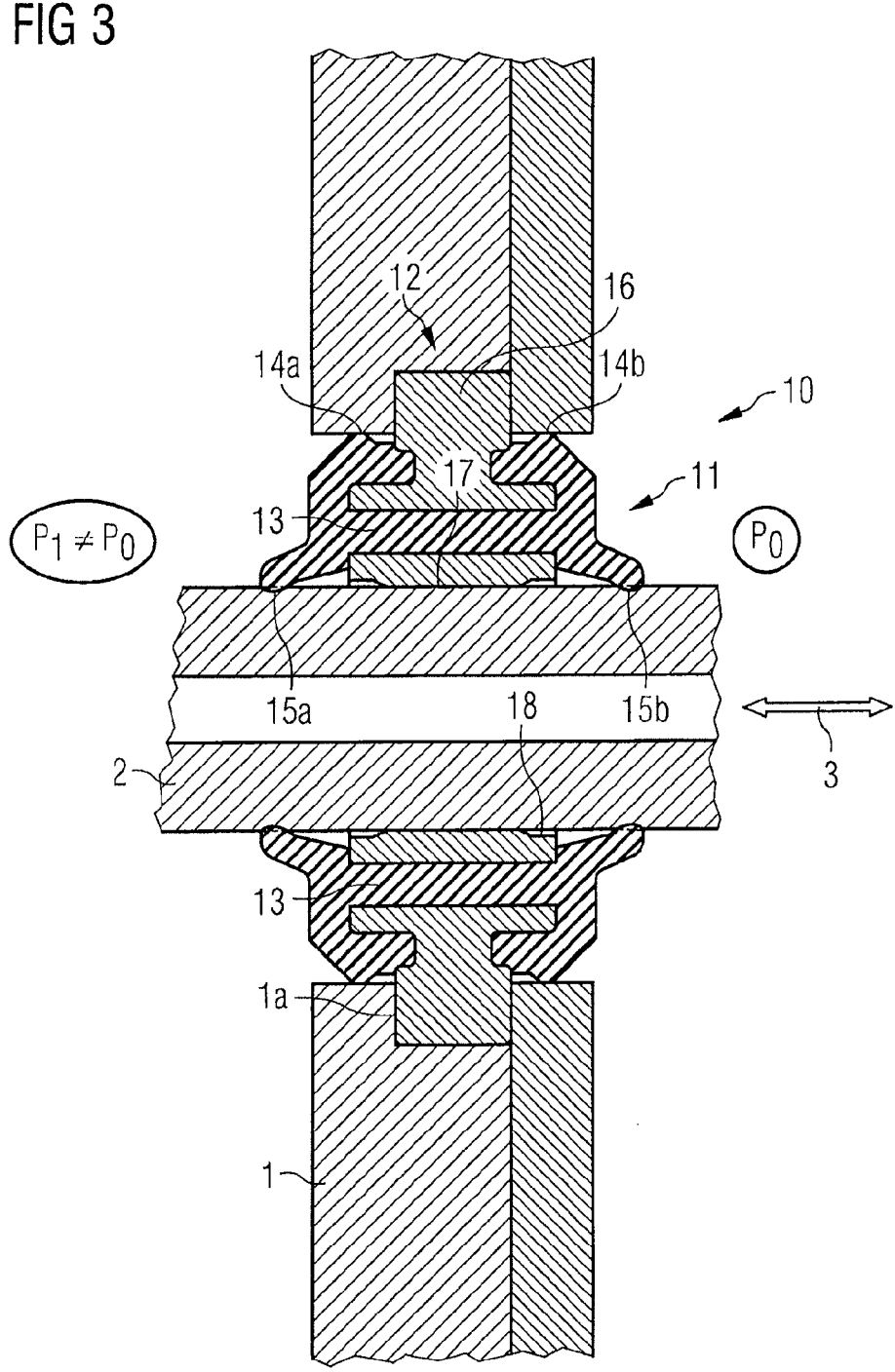

Hereinafter the invention will be represented by way of example with reference to the attached drawings. Therein are shown:

FIG. 1 an electromagnetically actuated valve from the prior art,

FIG. 2 an electromagnetically actuated valve according to the invention having a dynamic seal, and FIG. 3 the dynamic seal from the valve from FIG. 2 in detail.

FIG. 1 shows a known electromagnetically actuated valve from the prior art (WO 2005/102807 A1) which can be employed for example as a transverse shut-off valve for an air suspension system of a vehicle. The valve 20 is inserted into a valve block 30 and opens or closes the connection between valve ports 100, 101, with flow being possible through the valve 20 in both directions. O-rings 29 seal the valve 20 against the valve block 30. FIG. 1 shows the valve 20 in the energized state in which the valve passage 21 is opened.

The valve 20 has an axially displaceable control piston 2 which is guided within a stationary sleeve 1. Firmly connected to the sleeve 1 is a metal core, the so-called pole member 23. An electrically energizable coil 40 is disposed around the pole member 23 and the magnetic armature 2 and supplied with current via connections 42. In the represented energized state, an electromagnetic field is generated which moves the control piston 2 acting as a magnetic armature in the direction of the pole member 23. In so doing, the force of a spring 22 is overcome which counteracts the magnetic force and urges the valve 20 into the closed position. A flux-conducting tube 28 and a yoke 41 serve to homogenize the electromagnetic field. Buffers 27 damp the contact between the control piston 2 and the pole member 23 and maintain a residual air gap.

For closing the valve 20, a preferably elastic sealing element 32 is urged against a likewise preferably elastic sealing seat 31 by means of the force of the spring 22 and seals the valve port 100 against the valve port 101. The spring is configured such that it holds the valve 20 in the closed position, even when the pressure difference counteracts the spring force. For opening the valve 20, the magnetic force overcomes the force of the spring 22 and, where applicable, the pressure difference between the valve ports 100, 101, if the pressure difference acts in the direction of the spring force. At great nominal widths of the valve 20 and great pressure differences, for example more than 20 bar, 10 bar or at least 5 bar, this requires a very high magnetic force, because then a strong spring is necessary for holding the valve 20 closed even at high pressure differences.

To avoid this problem, the valve 20 according to the invention, represented in FIG. 2, possesses a pressure compensation bore 24 which connects the valve port 100 through the control piston 2 to the bore 25 for the spring 22 and in particular to the air gap 26 and thus the back side of the control piston 2. Since the pressure compensation bore 24 causes the two pressure sides of the valve 20 to be connected, a radial and axial seal with simultaneous guidance of the control piston 2 is necessary to avoid leakage. This is effected by a dynamic seal 10, which will be explained more closely hereinbelow in connection with FIG. 3.

FIG. 2 represents the unenergized, closed state of the valve 20. The control piston 2 has a magnetic armature 4 that is separate but connected to the control piston 2. As shown in FIG. 1, the control piston 2 and the magnetic armature 4 can also form an integral part, however.

The basic structure and the manner of functioning of the valve 20 represented in FIG. 2 otherwise correspond to the structure and the manner of functioning of the valve 20 represented in FIG. 1. The valve 20 from FIG. 2 is likewise provided for employment in an air suspension system of an automobile and can be inserted into a corresponding air suspension valve block 30.

The pressure compensation bore 24 extends in the axial direction, substantially along the longitudinal axis X-X of the valve 20. In the region of the valve passage 21 and the sealing lips 15a, 15b of the dynamic seal 10, substantially the same nominal width is provided, the sealing seat 31 in particular having substantially the same nominal width as the sealing lips 15a, 15b. This makes a pressure compensation possible, as to be explained hereinafter.

If the pressure is present at the valve port 100, the pressure passes via the pressure compensation bore 24 and the bore 25 into the air gap 26 to the back side of the control piston 2 and past the sides of the magnetic armature 4 to the sealing lip 15b of the dynamic seal 10, so that the pressure exerts substantially no force on the control piston 2. If the pressure is present at the other valve port 101, the pressure is also substantially compensated with regard to the control piston 2, since the pressure is present at the sealing seat 31 and the sealing lip 15a of the dynamic seal 10, which have substantially the same nominal width. Altogether, there is thus, on the one hand, no need for a stronger spring 22 to hold the valve 20 closed when the pressure is present at the valve port 100, so that, on the other hand, there is also no need for a stronger magnetic force which in extreme cases would have to overcome the spring force, the pressure difference and any frictional forces. The valve 20 according to FIG. 2 is thus also suitable for great nominal widths and high pressure differences.

FIG. 3 shows the dynamic seal 10 of the valve 20 from FIG. 2 in further detail. There are shown a stationary member 1 and a movable member 2 which is displaceable relative to the stationary member 1 in opposite directions 3. The two members 1 and 2 are mutually sealed radially inwardly and outwardly by means of the dynamic seal 10. In the valve 20 from FIG. 2 the stationary member is the sleeve 1, and the axially movable member the control piston 2, also called a ram. The seal 10 mutually seals two pressure chambers with different pressures P0 and P1 in the axial direction at the same time. The represented seal 10 is especially suitable for application in valves for air suspension systems as described hereinabove, but also for other control devices, such as valves and setting pistons, that are actuated by means of pressurization, in particular pneumatic pressure, and wherein a drive element is actuated by means of the movable member 2. The stationary member 1 is, as described, a sleeve, for example in the form of a guide cylinder or any kind of walling, for example a pressure-chamber partition or a housing's outer wall, which encloses the seal 10 in the circumferential direction.

The seal 10 preferably consists of only two components, namely a sealing body 11 made of elastomeric material, e.g. EPDM with the hardness 75 Shore A and added PTFE, and a supporting body 12 configured integrally therewith and made of a substantially harder plastic material in comparison to the sealing body, e.g. glass-fiber-reinforced PPS. The two components 11 and 12 of the seal 10 are manufactured by two-step injection molding, first the hard component 12, which is subsequently overmolded with the elastomeric component 11. To ensure a reliable integral connection of the two components, the supporting body 12 is provided with passages 13 distributed over the circumference which are preferably completely filled with the elastomeric material of the sealing body 11.

At least the sealing body 11, and preferably the entire seal 10 including the supporting body 12, are constructed symmetrically in such a way that their axial cross section is tilt-symmetric relative to a radial axis of symmetry. Thus, the seal 10 possesses the same sealing properties independently of the moving direction 3, and the direction of orientation upon its arrangement between the two members 1 and 2 is also uncritical.

On both sides of this axis of symmetry, the sealing body 11 respectively has (at least) one sealing lip both on its radially interior side and on its radially exterior side, i.e. altogether (at least) four sealing lips. Between the two outer sealing lips 14a, 14b and the two radially inner sealing lips 15a, 15b, the supporting body 12 respectively possesses a radially exposed portion 16 and 17. The radially exterior portion 16 of the supporting body 12 extends beyond the two adjacent sealing lips 14a, 14b in the radial direction and thus forms an anchoring portion by means of which the seal 10 is anchored in a recess 1a, for example in a circumferential groove, of the member 1.

The portion 17 of the supporting body 12 that is exposed on the radially interior side is configured as a guiding portion, however, and performs an axial guidance function for the axially displaceable member 2 during operation of the control device. To enable this guidance function to be guaranteed, the axial extension length of the guiding portion amounts to at least one third and preferably half or more than half of the total width of the seal 10. The ratio of guiding portion length L and nominal diameter D preferably lies at $L/D \geq 0.4$, in particular $L/D \geq 0.5$. At a nominal diameter of e.g. 5.9 mm, the guiding portion length preferably amounts to about 3.2 mm (ratio L/D about 0.54).

The movable member 2 slides within the guiding portion 17 of the supporting body 12. For this purpose, the guide is configured as a close clearance fit and is preferably lubricated with oil or grease. The minimum clearance of the fit should be greater than 0.025 mm, and the maximum clearance smaller than 0.150 mm. Preferably, the clearance lies between 0.034 and 0.102 mm. The guiding portion 17 has adjacent thereto, on both sides, run-in slopes 18 which promote the oil or grease lubrication between the supporting body 12 and the movable member 2 in the region of the guiding portion 17.

It is furthermore important that the two sealing lips 15a, 15b having the guiding portion 17 of the supporting body 12 extending therebetween extend beyond the guiding portion 17 in the radial direction, in order that they can perform their sealing function relative to the movable member 2 during operation of the control device. This is represented schematically in FIG. 1 in such a way that the two sealing lips 15a, 15b extend into the movable member 2, although in reality they of course come to lie against the outer surface of the movable member 2 in the operating state.

The seal 10 can also conversely be so configured that the anchoring portion 16 is disposed on the radially interior side of the seal 10, and the guiding portion 17 on the radially exterior side thereof. This is expedient for applications wherein the radially interior member 2 is stationary and the radially exterior member 1 movable. Alternatively, instead of the radially exterior anchoring portion 16, there can be provided there too a radially exposed guiding portion similar to the guiding portion 17. This is expedient for applications wherein both members 1 and 2 are movable. In this case, the seal 10 would then be fixed stationarily in the axial and radial directions and thus be adapted accordingly.

The invention claimed is:

1. A seal for mutually sealing radially two members that are displaceable relative to each other axially, comprising:
   a sealing body made of elastomeric material having two axially spaced, radially exterior sealing lips and two axially spaced, radially interior sealing lips, and
   a supporting body bearing the sealing body and consisting of a harder material than the sealing body,
   wherein the supporting body has a radially exposed guiding portion extending between respective two sealing lips of one of said two radially interior and said two radially exterior sealing lips in the axial direction, said respective two sealing lips extending beyond the guiding portion in the radial direction, and
   wherein the supporting body has an anchoring portion opposing the guiding portion, the anchoring portion being disposed between and extending in the radial direction beyond respective two sealing lips of the other one of said two radially interior and said two radially exterior sealing lips.

2. The seal according to claim 1, wherein the guiding portion of the supporting body is configured on a radially inwardly pointing surface of the seal.

3. The seal according to claim 2, wherein the material of the sealing body is formed onto the supporting body in a primary forming process.

4. The seal according to claim 3, wherein the material of the sealing body penetrates the supporting body.

5. The seal according to claim 4, wherein the supporting body possesses at least one axial passage filled with the material of the sealing body.

6. The seal according to claim 5, wherein the material of the supporting body is a polymeric material.

7. The seal according to claim 6, wherein the axial cross section of at least the sealing body is tilt-symmetric relative to a radial axis of symmetry.

8. The seal according to claim 4, wherein the supporting body and the sealing body of the seal are manufactured by two-step injection molding, first the supporting body, which is subsequently overmolded with the sealing body.

9. The seal according to claim 1, wherein the two sealing lips extending beyond the guiding portion in the radial direction extend away from each other in the axial direction and the two sealing lips between which the anchoring portion is disposed extend towards each other in the axial direction.

10. The seal according to claim 9, wherein the supporting body and the sealing body of the seal are manufactured by two-step injection molding, first the supporting body, which is subsequently overmolded with the sealing body.

11. The seal according to claim 1, wherein the supporting body and the sealing body of the seal are manufactured by two-step injection molding, first the supporting body, which is subsequently overmolded with the sealing body.

12. A control device, comprising a first member that is displaceable axially by means pneumatic pressurization, and a stationary second member relative to which the first member is guided axially displaceably, wherein the two members are mutually sealed radially by means of the seal recited in claim 1 such that the guiding portion of the supporting body of the seal performs an axial guidance function for the axially displaceable member during operation of the control device.

13. An electromagnetically actuated valve, comprising
a sealing element which is arranged to close a sealing seat when in a closed position,
an axially movable control piston coupled with the sealing element,
a sleeve within which the control piston is mounted so as to be axially displaceable,
an electrically energizable coil, with the control piston being movable, through electrical energizing of the coil, against a mechanical load acting on the control piston,
wherein the control piston has a pressure compensation bore in the axial direction, with the control piston and the sleeve being mutually sealed radially by means of the seal recited in claim 1 such that the guiding portion of the supporting body of the seal performs an axial guidance function for the control piston during operation of the valve.

14. The valve according to claim 13, wherein the sealing seat has substantially the same nominal width as the radially interior sealing lips.

15. The valve according to claim 13, wherein the control piston is movable, through electrical energizing of the coil, against the mechanical load acting on the control piston into a position in which the sealing element assumes the closed position.

16. The valve according to claims 13, wherein the mechanical load acting on the control piston is effected by means of a spring which urges the control piston into the closed position.

* * * * *